United States Patent
Zhang et al.

(10) Patent No.: US 10,813,084 B2
(45) Date of Patent: Oct. 20, 2020

(54) WIRELESS COMMUNICATIONS METHOD AND SYSTEM, BASE STATION, AND USER EQUIPMENT

(71) Applicant: Huawei Technologies Co., Ltd., Shenzhen (CN)

(72) Inventors: Hongping Zhang, Shanghai (CN); Qinghai Zeng, Shanghai (CN); Jian Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 15/499,596

(22) Filed: Apr. 27, 2017

(65) Prior Publication Data

US 2017/0230950 A1 Aug. 10, 2017

Related U.S. Application Data

(63) Continuation of application No. PCT/CN2014/089567, filed on Oct. 27, 2014.

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/0408* (2013.01); *H04B 7/0617* (2013.01);
(Continued)

(58) Field of Classification Search
CPC ........... H04W 72/042; H04W 72/0453; H04W 16/28; H04W 76/15; H04W 88/06; H04W 88/10; H04B 17/318
See application file for complete search history.

(56) References Cited

U.S. PATENT DOCUMENTS 6,694,155 B1   2/2004 Chin et al.
7,929,970 B1 * 4/2011 Gunasekara .......... H04W 36/04
                                                     455/444
(Continued)

FOREIGN PATENT DOCUMENTS

CN   1735255 A   2/2006
CN   1893344 A   1/2007
(Continued)

OTHER PUBLICATIONS

Sawahashi et al., "Receiving Apparatus, Receiving Method, Transmitting Apparatus and Transmitting Method Used for Uplink Channel", Apr. 30, 2008, CN, CN101171775A, English machine translation of CN101171775A. (Year: 2008).*

(Continued)

*Primary Examiner* — Ricky Q Ngo
*Assistant Examiner* — Michael K Phillips
(74) *Attorney, Agent, or Firm* — Leydig, Voit & Mayer, Ltd.

(57) ABSTRACT

The present invention discloses a wireless communications method and system, a base station, and user equipment. The base station includes: a signaling transmission module, configured to transmit downlink control signaling to user equipment on a first frequency band; and a data transmission module, connected to the signaling transmission module and configured to transmit downlink user data to the user equipment by using a beamforming technology on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band. According to the (Continued)

foregoing disclosed content, the present invention can improve system performance.

18 Claims, 5 Drawing Sheets

(51) Int. Cl.
    *H04L 5/26*     (2006.01)
    *H04B 7/06*     (2006.01)
    *H04B 7/0408*     (2017.01)
    *H04B 17/318*     (2015.01)
    *H04W 16/28*     (2009.01)

(52) U.S. Cl.
    CPC ......... *H04B 17/318* (2015.01); *H04L 5/0091* (2013.01); *H04L 5/26* (2013.01); *H04W 16/28* (2013.01); *H04W 72/0453* (2013.01)

(56) References Cited

U.S. PATENT DOCUMENTS

| | | | |
|---|---|---|---|
| 2009/0201902 A1 | 8/2009 | Miki et al. | |
| 2010/0311429 A1* | 12/2010 | Baker | H04W 8/22 455/450 |
| 2011/0151913 A1 | 6/2011 | Forster et al. | |
| 2011/0280205 A1* | 11/2011 | Qin | H04W 72/082 370/329 |
| 2012/0052793 A1* | 3/2012 | Brisebois | H04W 88/06 455/1 |
| 2014/0016573 A1* | 1/2014 | Nuggehalli | H01Q 1/242 370/329 |
| 2014/0148107 A1* | 5/2014 | Maltsev | H04B 1/02 455/91 |
| 2015/0004918 A1* | 1/2015 | Wang | H04W 88/02 455/73 |
| 2015/0092676 A1* | 4/2015 | Periyalwar | H04W 4/029 370/329 |
| 2016/0044584 A1* | 2/2016 | Jung | H04B 7/0617 370/330 |
| 2016/0192433 A1* | 6/2016 | Deenoo | H04W 72/046 370/329 |
| 2016/0330643 A1* | 11/2016 | Sahin | H04W 16/14 |
| 2017/0033854 A1* | 2/2017 | Yoo | H04W 24/00 |
| 2017/0034812 A1* | 2/2017 | Deng | H04W 72/046 |

FOREIGN PATENT DOCUMENTS

| | | | | |
|---|---|---|---|---|
| CN | 101171775 A | * | 4/2008 | ............ H04W 88/08 |
| CN | 101171775 A | | 4/2008 | |
| CN | 103023543 A | | 4/2013 | |
| WO | 2014151951 A1 | | 9/2014 | |

OTHER PUBLICATIONS

"Views on muting and reuse factors for CSI-RS," 3GPP TSG RAN1#61, Montreal, Canada, R1-103163, 3$^{rd}$ Generation Partnership Project, Valbonne, France (May 10-14, 2010).

"Requirements and necessary enhancements for Rel-12 NCT," 3GPP TSG RAN WG1 Meeting #71, New Orleans, USA, R1-124856, 3rd Generation Partnership Project, Valbonne, France (Nov. 12-16, 2012).

* cited by examiner

WIRELESS COMMUNICATIONS METHOD AND SYSTEM, BASE STATION, AND USER EQUIPMENT

CROSS-REFERENCE TO RELATED APPLICATIONS

This application is a continuation of International Application No. PCT/CN2014/089567, filed on Oct. 27, 2014, the disclosure of which is hereby incorporated by reference in its entirety.

TECHNICAL FIELD

The present invention relates to the communications field, and in particular, to a wireless communications method and system, a base station, and user equipment.

BACKGROUND

If an existing mobile cellular system is a TDD (time division duplex) system, one cell uses one frequency band. The frequency band provides an uplink service and a downlink service by means of time division, that is, a frequency resource is used for downlink transmission in a current short period of time, and then the frequency resource may be used for uplink transmission in a next short period of time. For example, in an LTE (Long Term Evolution) system, a resource is classified into a frame and a subframe in a time domain, a length of one frame is 10 ms, and one frame includes 10 subframes. For a TDD LTE system, among 10 subframes, some subframes are used for downlink transmission, and some subframes are used for uplink transmission. If an existing mobile cellular system is an FDD (frequency division duplex) system, one cell uses two frequency bands. One frequency band is used to provide a downlink service, and the other frequency band is used to provide an uplink service, that is, a downlink service and an uplink service may be provided at a same time on the two frequency bands. All subframes on the uplink frequency band are used for uplink transmission, and all subframes on the downlink frequency band are used for downlink transmission. Center frequencies of the two frequency bands are relatively close to each other. For example, the uplink frequency band is 1920 MHz to 1980 MHz, and the downlink frequency band is 2110 MHz to 2170 MHz.

In an existing mobile cellular communication technology, a frequency band of about 2 GHz or a lower frequency band is usually used. In the prior art, a 6 GHz or even a higher frequency band is not used for mobile cellular communications With rapid development of a data service and an intelligent terminal, a high-speed service and a service with a large amount of data have an increasing demand on a spectrum. A super high frequency (SHF) refers to a radio wave whose wavelength is 1 to 10 centimeters and whose frequency range is 3 GHz to 30 GHz, and is also referred to as a centimetric wave. An extremely high frequency (EHF) refers to a spectrum whose wavelength is 1 to 10 millimeters and whose frequency range is 30 GHz to 300 GHz, and is also referred to as a millimeter wave. The centimetric wave and the millimeter wave have a large number of available bandwidths, and will become potential target spectrums for future development of the $5^{th}$ generation mobile communications and the 3GPP. A main challenge of applying these frequency bands in the mobile cellular communications is that the bands have relatively high free space attenuation. In addition, attenuation caused by factors such as absorption by air, and absorption and scattering by rain, fog, a building, or another object is extremely large. Consequently, a coverage area of a cell is very small. A beamforming technology can be used to resolve a problem that a coverage area of a high frequency band cell is relatively small. A principle is that energy is sent to one relatively narrow direction, so as to increase a coverage radius. However, in the beamforming technology, energy can be sent only to one relatively narrow direction at a time. If a broadcast message needs to be sent to all UEs (user equipment) in the cell, that is, the energy needs to be sent in all directions of the cell, the beamforming technology can hardly meet the requirement, and the broadcast message needs to be periodically sent in all directions. Consequently, efficiency is low, and implementation is complex.

SUMMARY

In view of this, embodiments of the present invention provide a wireless communications method and system, a base station, and user equipment, so as to improve system performance.

According to a first aspect, a base station is provided, including: a signaling transmission module, configured to transmit downlink control signaling to user equipment on a first frequency band; and a data transmission module, connected to the signaling transmission module and configured to transmit downlink user data to the user equipment by using a beamforming technology on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band.

With reference to the implementation manner of the first aspect, in a first possible implementation manner, the downlink control signaling includes at least one of the following: system information, paging signaling, random access signaling, RRC signaling, layer 2 signaling, physical layer signaling, a sounding reference signal, or a synchronization signal.

With reference to the implementation manner of the first aspect, in a second possible implementation manner, the base station further includes a receiving module, connected to the data transmission module and configured to receive, on the first frequency band, at least one of uplink control signaling, initial access signaling, or random access signaling, wherein the at least one of the uplink control signaling, the initial access signaling, or the random access signaling is sent by the user equipment.

With reference to the second possible implementation manner of the first aspect, in a third possible implementation manner, the receiving module receives the initial access signaling or the random access signaling that is sent by the user equipment on the first frequency band, and obtains a signal transmission direction of the user equipment; and the data transmission module transmits, on the second frequency band, the downlink user data to the user equipment according to the signal transmission direction by using the beamforming technology.

With reference to the implementation manner of the first aspect, in a fourth possible implementation manner, the receiving module receives, on a third frequency band, at least one of uplink control signaling, initial access signaling, or random access signaling, where the at least one of the uplink control signaling, the initial access signaling, or the random access signaling is sent by the user equipment, the third frequency band and the first frequency band belong to the same cell and are synchronous, a frequency of the third frequency band is lower than the frequency of the second frequency band, and a bandwidth of the third frequency band is less than the bandwidth of the second frequency band.

With reference to the fourth possible implementation manner of the first aspect, in a fifth possible implementation manner, the receiving module receives the initial access signaling or the random access signaling that is sent by the user equipment on the third frequency band, and obtains a signal transmission direction of the user equipment; and the data transmission module transmits, on the second frequency band, the downlink user data to the user equipment according to the signal transmission direction by using the beamforming technology.

With reference to the implementation manner of the first aspect, in a sixth possible implementation manner, the base station further includes a determining module, connected to the signaling transmission module; the signaling transmission module broadcasts a signal strength threshold on the first frequency band; and the determining module determines, according to the signal strength threshold and actual signal strength that is of the first frequency band and that is reported by the user equipment, whether the user equipment has entered a coverage area of the cell.

With reference to the sixth possible implementation manner of the first aspect, in a seventh possible implementation manner, the signal strength threshold is equal to or close to signal strength of the first frequency band at a coverage edge of the cell or the second frequency band.

With reference to the sixth possible implementation manner of the first aspect, in an eighth possible implementation manner, the determining module further estimates a channel state of the second frequency band according to the signal strength threshold and the actual signal strength that is of the first frequency band and that is measured by the user equipment.

According to a second aspect, a wireless communications method is provided, including: transmitting, by a base station, downlink control signaling to user equipment on a first frequency band; and transmitting, by the base station, downlink user data to the user equipment by using a beamforming technology on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band.

With reference to the implementation manner of the second aspect, in a first possible implementation manner, the downlink control signaling includes at least one of the following: system information, paging signaling, random access signaling, RRC signaling, layer 2 signaling, physical layer signaling, a sounding reference signal, or a synchronization signal.

With reference to the implementation manner of the second aspect, in a second possible implementation manner, the method further includes: receiving, by the base station and on the first frequency band, at least one of uplink control signaling, initial access signaling, or random access signaling, where the at least one of the uplink control signaling, the initial access signaling, or the random access signaling is sent by the user equipment.

With reference to the second possible implementation manner of the second aspect, in a third possible implementation manner, the transmitting, by the base station, downlink user data to the user equipment by using a beamforming technology on a second frequency band includes: receiving, by the base station, the initial access signaling or the random access signaling that is sent by the user equipment on the first frequency band, and obtaining a signal transmission direction of the user equipment; and transmitting, by the base station, downlink user data to the user equipment according to the signal transmission direction by using the beamforming technology on the second frequency band.

With reference to the implementation manner of the second aspect, in a fourth possible implementation manner, the method further includes: receiving, by the base station and on a third frequency band, at least one of uplink control signaling, initial access signaling, or random access signaling, where the at least one of the uplink control signaling, the initial access signaling, or the random access signaling is sent by the user equipment, the third frequency band and the first frequency band belong to the same cell and are synchronous, a frequency of the third frequency band is lower than the frequency of the second frequency band, and a bandwidth of the third frequency band is less than the bandwidth of the second frequency band.

With reference to the fourth possible implementation manner of the second aspect, in a fifth possible implementation manner, the transmitting, by the base station, downlink user data to the user equipment by using a beamforming technology on a second frequency band includes: receiving, by the base station, the initial access signaling or the random access signaling that is sent by the user equipment on the third frequency band, and obtaining a signal transmission direction of the user equipment; and transmitting, by the base station, downlink user data to the user equipment according to the signal transmission direction by using the beamforming technology on the second frequency band.

With reference to the implementation manner of the second aspect, in a sixth possible implementation manner, the method further includes: broadcasting, by the base station, a signal strength threshold on the first frequency band; and determining, by the base station according to the signal strength threshold and actual signal strength that is of the first frequency band and that is reported by the user equipment, whether the user equipment has entered a coverage area of the cell.

With reference to the sixth possible implementation manner of the second aspect, in a seventh possible implementation manner, the signal strength threshold is equal to or close to signal strength of the first frequency band at a coverage edge of the cell or the second frequency band.

With reference to the sixth possible implementation manner of the second aspect, in an eighth possible implementation manner, the method further includes: estimating, by the base station, a channel state of the second frequency band according to the signal strength threshold and the actual signal strength that is of the first frequency band and that is measured by the user equipment.

According to a third aspect, user equipment is provided, including: a signaling receiving module, configured to receive downlink control signaling that is transmitted by a base station on a first frequency band; and a data receiving module, connected to the signaling receiving module and configured to receive downlink user data transmitted by the base station on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band.

With reference to the implementation manner of the third aspect, in a first possible implementation manner, the downlink control signaling includes at least one of the following: system information, paging signaling, random access signaling, RRC signaling, layer 2 signaling, physical layer signaling, a sounding reference signal, or a synchronization signal.

With reference to the implementation manner of the third aspect, in a second possible implementation manner, the user equipment further includes a sending module, configured to send, on the first frequency band, at least one of uplink control signaling, initial access signaling, or random access signaling to the base station.

With reference to the second possible implementation manner of the third aspect, in a third possible implementation manner, the sending module sends, on the first frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology.

With reference to the implementation manner of the third aspect, in a fourth possible implementation manner, the sending module is configured to send, on the third frequency band, at least one of uplink control signaling, initial access signaling, or random access signaling to the base station, where the third frequency band and the first frequency band belong to the same cell and are synchronous, a frequency of the third frequency band is lower than the frequency of the second frequency band, and a bandwidth of the third frequency band is less than the bandwidth of the second frequency band.

With reference to the fourth possible implementation manner of the third aspect, in a fifth possible implementation manner, the sending module sends, on the third frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology.

With reference to the third or the fifth possible implementation manner of the third aspect, in a sixth possible implementation manner, the base station further includes a transmission module, connected to the data receiving module; the data receiving module receives the signal transmission direction sent by the base station; and the transmission module transmits uplink user data to the base station according to the signal transmission direction.

With reference to the second or the fourth possible implementation manner of the third aspect, in a seventh possible implementation manner, the user equipment further includes a measurement module connected to the signaling receiving module, and if the user equipment is in an idle state, the measurement module measures on the first frequency band or the third frequency band signal strength of the first frequency band.

With reference to the implementation manner of the third aspect, in an eighth possible implementation manner, the user equipment further includes a determining module, connected to the signaling receiving module; the signaling receiving module receives a signal strength threshold that is broadcast by the base station on the first frequency band; and the determining module determines, according to the signal strength threshold and measured actual signal strength of the first frequency band, whether the user equipment has entered a coverage area of the cell.

With reference to the eighth possible implementation manner of the third aspect, in a ninth possible implementation manner, the signal strength threshold is equal to or close to signal strength of the first frequency band at a coverage edge of the cell or the second frequency band.

According to a fourth aspect, a wireless communications method is provided, including: receiving, by user equipment, downlink control signaling that is transmitted by a base station on a first frequency band; and receiving, by the user equipment, downlink user data that is transmitted by the base station by using a beamforming technology on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band.

With reference to the implementation manner of the fourth aspect, in a first possible implementation manner, the downlink control signaling includes at least one of the following: system information, paging signaling, random access signaling, RRC signaling, layer 2 signaling, physical layer signaling, a sounding reference signal, or a synchronization signal.

With reference to the implementation manner of the fourth aspect, in a second possible implementation manner, the method further includes: sending, by the user equipment and on the first frequency band, at least one of uplink control signaling, initial access signaling, or random access signaling to the base station.

With reference to the second possible implementation manner of the fourth aspect, in a third possible implementation manner, the method further includes: sending, by the user equipment and on the first frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology.

With reference to the implementation manner of the fourth aspect, in a fourth possible implementation manner, the method further includes: sending, by the user equipment and on a third frequency band, at least one of uplink control signaling, initial access signaling, or random access signaling to the base station, where the third frequency band and the first frequency band belong to the same cell and are synchronous, a frequency of the third frequency band is lower than the frequency of the second frequency band, and a bandwidth of the third frequency band is less than the bandwidth of the second frequency band.

With reference to the fourth possible implementation manner of the fourth aspect, in a fifth possible implementation manner, the method further includes: sending, by the user equipment and on the third frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology.

With reference to the third or the fifth possible implementation manner of the fourth aspect, in a sixth possible implementation manner, the method further includes:

receiving, by the user equipment, the signal transmission direction sent by the base station; and transmitting, by the user equipment, uplink user data to the base station according to the signal transmission direction.

With reference to the second or the fourth possible implementation manner of the fourth aspect, in a seventh possible implementation manner, the method further includes: if the user equipment is in an idle state, measuring signal strength of the first frequency band on the first frequency band or the third frequency band.

With reference to the implementation manner of the fourth aspect, in an eighth possible implementation manner, the method further includes: receiving, by the user equipment, a signal strength threshold that is broadcast by the base station on the first frequency band; and determining, by the user equipment according to the signal strength threshold and measured actual signal strength of the first frequency band, whether the user equipment has entered a coverage area of the cell.

With reference to the eighth possible implementation manner of the fourth aspect, in a ninth possible implementation manner, the signal strength threshold is equal to or close to signal strength of the first frequency band at a coverage edge of the cell or the second frequency band.

According to a fifth aspect, a wireless communications system is provided, including the base station according to any one of the first aspect or the first to the eighth possible implementation manners of the first aspect and the user equipment according to any one of the third aspect or the first to the ninth possible implementation manners of the third aspect.

In the present invention, two frequency bands are used for downlink data transmission. A base station transmits downlink control signaling to user equipment on a first frequency band, and transmits downlink user data to the user equipment on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band. The first frequency band uses a lower spectrum resource compared with that used by the second frequency band, so as to effectively improve a coverage area of the cell; and the first frequency band is used to transmit only downlink control signaling, and a bandwidth may be very narrow, so as to save valuable spectrum resource, and improve signaling reliability and spectral efficiency. The second frequency band uses an extremely high frequency or super high frequency spectrum resource, and a bandwidth is very wide, so as to provide high-speed user data transmission, and improve system performance.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
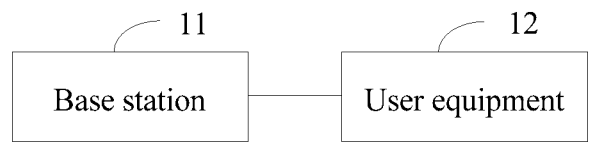
FIG. 1 is a schematic structural diagram of a wireless communications system according to a first embodiment of the present invention.

Referring to FIG. 1, FIG. 1 is a schematic structural diagram of a wireless communications system according to a first embodiment of the present invention. As shown in FIG. 1, the wireless communications system 10 includes a base station 11 and user equipment 12. The base station 11 transmits downlink control signaling to the user equipment 12 on a first frequency band. The base station 11 transmits downlink user data to the user equipment 12 by using a beamforming technology on a second frequency band. The first frequency band and the second frequency band belong to a same cell and are synchronous, a frequency of the first frequency band is lower than a frequency of the second frequency band, and a bandwidth of the first frequency band is less than a bandwidth of the second frequency band. Being synchronous means that, from a perspective of a base station 11, both frame numbers and frame boundaries of data frames or control frames that are transmitted on the first frequency band and the second frequency band are consistent. The downlink control signaling includes at least one of the following: system information, paging signaling, random access signaling, RRC signaling, layer 2 signaling, physical layer signaling, a sounding reference signal, or a synchronization signal. In this embodiment of the present invention, alternatively the first frequency band is used to transmit only control signaling, and the second frequency band is used to transmit only user data.

In this embodiment of the present invention, one cell uses two frequency bands for downlink data transmission, where the first frequency band is used to transmit downlink control signaling, and the second frequency band is used to transmit downlink user data. The second frequency band uses an extremely high frequency or super high frequency spectrum resource, and a bandwidth is very wide, for example, a bandwidth of tens of GHz. The second frequency band is used to provide high-speed user data transmission, and the beamforming technology is used to increase a transmit radius of the frequency band. The first frequency band uses a lower spectrum resource compared with that used by the second frequency band, and it is quite possible that a spectrum of the first frequency band is much lower than that of the second frequency band, such as a spectrum within 3 GHz; or a spectrum resource of a lower-frequency part of a super high frequency is used, such as a spectrum resource of 10 GHz. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system.

In a more specific embodiment, for uplink control signaling transmission, the base station 11 may receive, on the first frequency band, at least one of uplink control signaling, initial access signaling, or random access signaling, where the at least one of the uplink control signaling, the initial access signaling, or the random access signaling is sent by the user equipment 12. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Alternatively, the base station 11 receives, on a third frequency band, at least one of uplink control signaling, initial access signaling, or random access signaling, where the at least one of the uplink control signaling, the initial access signaling, or the random access signaling is sent by the user equipment 12. The third frequency band and the first frequency band belong to the same cell and are synchronous, a frequency of the third frequency band is lower than the frequency of the second frequency band, and a bandwidth of the third frequency band is less than the bandwidth of the second frequency band. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Frequencies of the third frequency band and the first frequency band are close, and bandwidths of the third frequency band and the first frequency band are close or equal, so as to ensure a proper coverage radius for uplink data transmission. In this embodiment of the present invention, if the user equipment 12 is in an idle state, signal strength of the first frequency band is measured on the first frequency band or the third frequency band. The user equipment 12 or the base station 11 determines cell selection according to the signal strength of the first frequency band. When needing to establish a connection so as to initiate a service, the user equipment 12 initiates the initial access on the first frequency band or the third frequency band.

Figure 2:
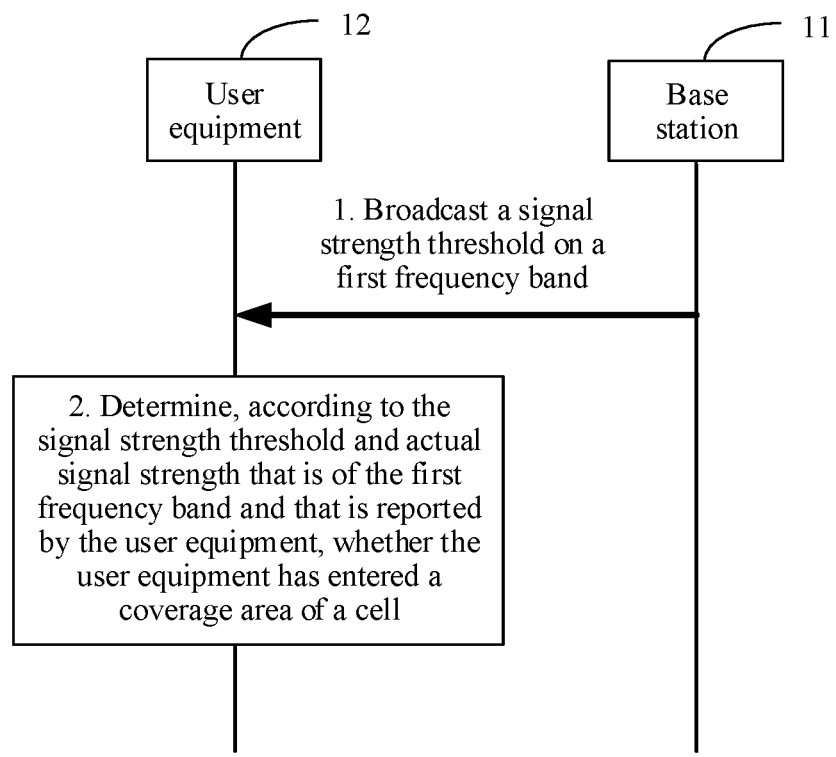
FIG. 2 is a schematic diagram of determining a coverage area in a wireless communications system according to a first embodiment of the present invention.

In this embodiment of the present invention, the frequency of the first frequency band is much lower than the frequency of the second frequency band; and under a same transmit power condition, a higher frequency indicates faster attenuation and a smaller coverage area. Therefore, even though the beamforming technology is used on the second frequency band, a coverage area of the second frequency band may be much smaller than that of the first frequency band. To ensure that the user equipment 12 enters the coverage area or a service range of the cell, that is, the user equipment 12 can transmit data, the first frequency band and the second frequency band use different transmit powers, that is, the first frequency band uses a lower transmit power, and the second frequency band uses a higher transmit power, so that the first frequency band and the second frequency band have a same coverage radius. However, in this method, a mapping table between a transmit power of the first frequency band and a transmit power of the second frequency band needs to be created; however, it is very difficult to create the mapping table. Alternatively, whether the cell is used as a target cell of the cell selection or cell reselection may be determined by determining whether the user equipment 12 has entered the coverage area of the cell. A determining method is shown in FIG. 2.

Step 1: The base station 11 broadcasts a signal strength threshold on the first frequency band. The signal strength threshold is equal to or close to signal strength of the first frequency band at a coverage edge of the cell or the second frequency band.

Step 2: Determine, according to the signal strength threshold and actual signal strength that is of the first frequency band and that is reported by the user equipment 12, whether the user equipment 12 has entered a coverage area of the cell.

Specifically, the user equipment 12 determines, according to the signal strength threshold and measured actual signal strength of the cell, whether to use the cell as the target cell of the cell selection or the cell reselection. Alternatively, the base station 11 estimates, according to the signal strength threshold and the actual signal strength that is of the cell and that is reported by the user equipment 12, whether to use the cell as the target cell for handover. If the actual signal strength that is of the first frequency band and that is measured by the user equipment 12 is greater than the signal strength threshold, it indicates that the user equipment 12 has entered the coverage area of the cell, and the cell is used as the target cell for handover. The base station 11 further estimates a channel state of the second frequency band according to the signal strength threshold and the actual signal strength that is of the first frequency band and that is measured by the user equipment 12. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment 12 is at a coverage edge of the second frequency band, and a signal on the second frequency band is relatively weak. Resource scheduling or a modulation and coding scheme used for transmission may be determined according to the obtained channel state of the second frequency band.

Figure 3:
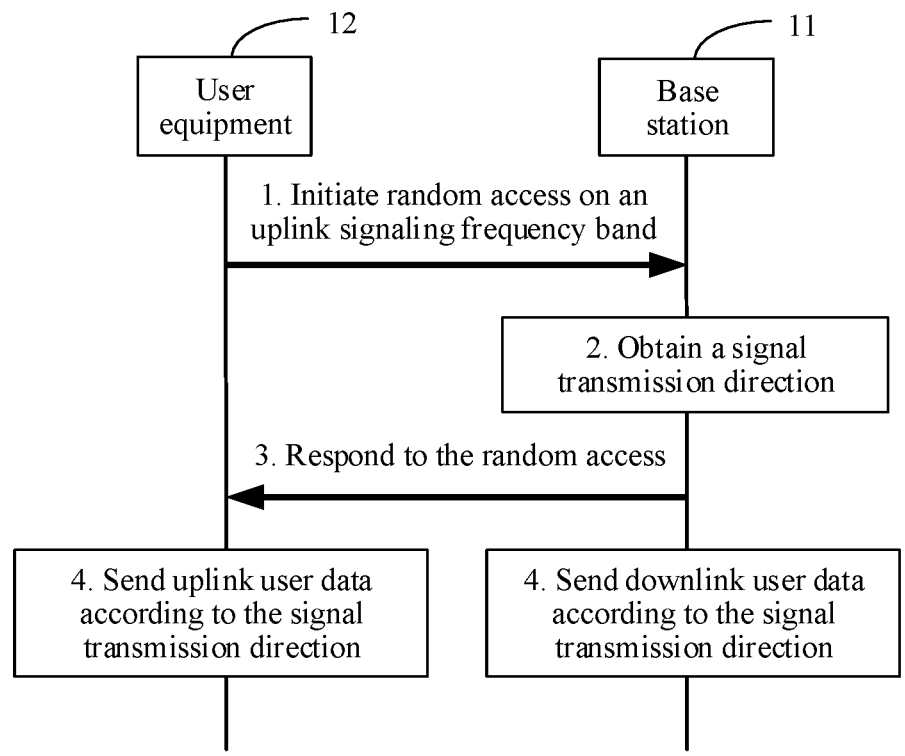
FIG. 3 is a schematic diagram of determining a signal transmission direction in a wireless communications system according to a first embodiment of the present invention.

By using the beamforming technology, a signal on the second frequency band is transmitted to only one very narrow direction. Therefore, before sending downlink user data, the base station 11 needs to learn of a direction of the user equipment 12, that is, a beamforming transmission direction needs to be determined, so that the user equipment 12 can receive the downlink user data. In this embodiment of the present invention, according to different methods for transmitting the uplink control signaling, the user equipment 12 sends the initial access signaling or the random access signaling on the first frequency band, and the base station 11 obtains a signal transmission direction of the user equipment 12 by using an antenna running on the first frequency band; or the user equipment 12 sends the initial access signaling or the random access signaling on the third frequency band, and the base station 11 obtains a signal transmission direction of the user equipment 12 by using an antenna running on the first frequency band. The base station 11 transmits downlink user data to the user equipment 12 according to the signal transmission direction by using the beamforming technology on the second frequency band. The base station 11 may also notify the user equipment 12 of the signal transmission direction, and the user equipment 12 may send uplink user data to the base station 11 according to the signal transmission direction. Specifically, a method for obtaining a signal transmission direction is shown in FIG. 3.

Step 1: The user equipment 12 initiates random access on an uplink signaling frequency band. The uplink signaling frequency band includes the first frequency band or the third frequency band.

Step 2: The base station 11 obtains a signal transmission direction.

Step 3: The user equipment 12 responds to the random access. Specifically, the base station 11 notifies the user equipment 12 of the signal transmission direction.

Step 4: The user equipment 12 sends uplink user data to the base station 11 according to the signal transmission direction; or the base station 11 sends downlink user data to the user equipment 12 according to the signal transmission direction.

The user equipment 12 may move during communications, and therefore the transmission direction is inaccurate after a period of time. In this case, if the user equipment 12 needs to send uplink user data, the user equipment 12 initiates a random access process on the uplink signaling frequency band, such as the first frequency band or the third frequency band, to re-obtain a signal transmission direction. The base station 11 may obtain, according to sending of uplink user data of the user equipment 12, a shift of the transmission direction, and may notify the user equipment 12 of the shift, so as to constantly adjust the transmission direction, thereby avoiding a case in which the user equipment 12 enters an uplink failure state.

In this embodiment of the present invention, a base station 11 transmits downlink control signaling to user equipment 12 on a first frequency band, and the base station 11 transmits downlink user data to the user equipment 12 by using a beamforming technology on a second frequency band. The first frequency band and the second frequency band belong to a same cell and are synchronous, a frequency of the first frequency band is lower than a frequency of the second frequency band, and a bandwidth of the first frequency band is less than a bandwidth of the second frequency band. This can effectively enlarge a coverage area of the cell, and improve signaling reliability and spectral efficiency, thereby improving system performance.

Figure 4:
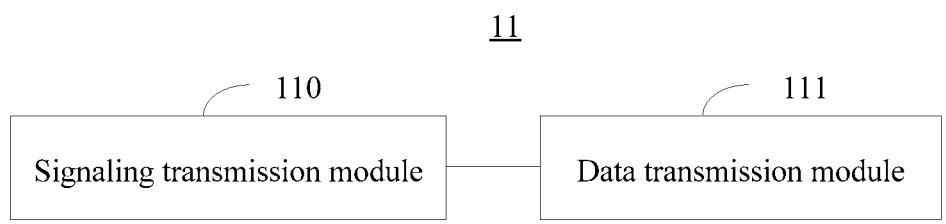
FIG. 4 is a schematic structural diagram of a base station according to a first embodiment of the present invention.

FIG. 4 is a schematic structural diagram of a base station according to a first embodiment of the present invention. As shown in FIG. 4, the base station 11 includes a signaling transmission module 110 and a data transmission module 111. The signaling transmission module 110 is configured to transmit downlink control signaling to user equipment on a first frequency band. The data transmission module 111 is connected to the signaling transmission module 110, and is configured to transmit downlink user data to the user equipment by using a beamforming technology on a second frequency band. The first frequency band and the second frequency band belong to a same cell and are synchronous, a frequency of the first frequency band is lower than a frequency of the second frequency band, and a bandwidth of the first frequency band is less than a bandwidth of the second frequency band. Being synchronous means that both frame numbers and frame boundaries of data frames or control frames that are transmitted on the first frequency band and the second frequency band are consistent.

In this embodiment of the present invention, one cell uses two frequency bands for downlink data transmission, where the first frequency band is used to transmit downlink control signaling, and the second frequency band is used to transmit downlink user data. The second frequency band uses an extremely high frequency or super high frequency spectrum resource, and a bandwidth is very wide, for example, a bandwidth of tens of GHz. The second frequency band is used to provide high-speed user data transmission, and the beamforming technology is used to increase a transmit radius of the frequency band. The first frequency band uses a lower spectrum resource compared with that used by the second frequency band, and it is quite possible that a spectrum of the first frequency band is much lower than that of the second frequency band, such as a spectrum within 3 GHz; or a spectrum resource of a lower-frequency part of a super high frequency is used, such as a spectrum resource of 10 GHz. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system.

In a more specific embodiment, the downlink control signaling transmitted by the signaling transmission module 110 to the user equipment on the first frequency band includes at least one of the following: system information, paging signaling, random access signaling, RRC signaling, layer 2 signaling, physical layer signaling, a sounding reference signal, or a synchronization signal. In this embodiment of the present invention, it may be also that the first frequency band is used to transmit only control signaling, and the second frequency band is used to transmit only user data.

Figure 5:
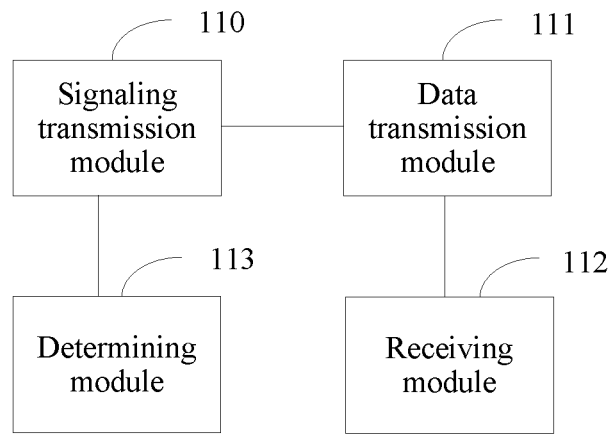
FIG. 5 is a schematic structural diagram of a base station according to a second embodiment of the present invention.

In this embodiment of the present invention, as shown in FIG. 5, the base station 11 further includes a receiving module 112 and a determining module 113. The receiving module 112 is connected to the data transmission module 111, and the determining module 113 is connected to the signaling transmission module 110. Uplink control signaling may be transmitted using two methods. Method 1: The receiving module 112 receives, on the first frequency band, at least one of uplink control signaling, initial access signaling, or random access signaling, where the at least one of the uplink control signaling, the initial access signaling, or the random access signaling is sent by the user equipment. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Method 2: The receiving module 112 receives, on a third frequency band, at least one of uplink control signaling, initial access signaling, or random access signaling, where the at least one of the uplink control signaling, the initial access signaling, or the random access signaling is sent by the user equipment. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Being synchronous means that, from a perspective of the base station 11, both frame numbers and frame boundaries of data frames or control frames that are transmitted on the first frequency band and the second frequency band are consistent. Frequencies of the third frequency band and the first frequency band are close, and bandwidths of the third frequency band and the first frequency band are close or equal, so as to ensure a proper coverage radius for uplink data transmission.

In this embodiment of the present invention, to ensure that the user equipment enters the coverage area or the service range of the cell, that is, the user equipment can transmit data, whether the user equipment has entered the coverage area of the cell needs to be determined. A determining method is that the signaling transmission module 110 broadcasts a signal strength threshold on the first frequency band, and the determining module 113 determines, according to the signal strength threshold and actual signal strength that is of the first frequency band and that is reported by the user equipment, whether the user equipment has entered the coverage area of the cell. The signal strength threshold is equal to or close to signal strength of the first frequency band at a coverage edge of the cell or the second frequency band. If the actual signal strength that is of the first frequency band and that is measured by the user equipment is greater than the signal strength threshold, it indicates that the user equipment has entered the coverage area of the cell, and the cell is used as the target cell for handover. In this embodiment of the present invention, the determining module 113 further estimates a channel state of the second frequency band according to the signal strength threshold and the actual signal strength that is of the first frequency band and that is measured by the user equipment. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment is at a coverage edge of the second frequency band, and a signal on the second frequency band is relatively weak. The base station 11 may determine, according to the obtained channel state of the second frequency band, resource scheduling for the user equipment or a modulation and coding scheme used for transmission.

By using the beamforming technology, a signal on the second frequency band is transmitted to only one very narrow direction. Therefore, before sending downlink user data, the base station 11 needs to learn of a direction of the user equipment, that is, a beamforming transmission direction needs to be determined, so that the user equipment can receive the downlink user data. In this embodiment of the present invention, according to different methods for transmitting the uplink control signaling, the receiving module 112 may receive the initial access signaling or the random access signaling that is sent by the user equipment on the first frequency band, and obtain a signal transmission direction of the user equipment; or the receiving module 112 receives the initial access signaling or the random access signaling that is sent by the user equipment on the third frequency band, and obtains a signal transmission direction of the user equipment; and the data transmission module 111 transmits, on the second frequency band, the downlink user data to the user equipment according to the signal transmission direction by using the beamforming technology. The base station 11 may also notify the user equipment of the signal transmission direction, so as to send uplink user data to the base station 11.

Figure 6:
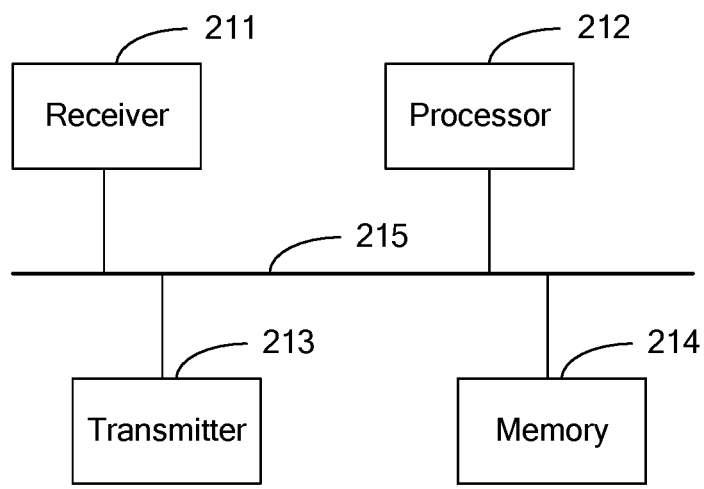
FIG. 6 is a schematic structural diagram of a base station according to a third embodiment of the present invention.

FIG. 6 is a schematic structural diagram of a base station according to a third embodiment of the present invention. As shown in FIG. 6, the base station 21 includes: a receiver 211, a processor 212, a transmitter 213, a memory 214, and a data bus 215. The receiver 211, the processor 212, the transmitter 213, and the memory 214 are connected by using the data bus 215 for mutual communication.

In this embodiment of the present invention, one cell uses two frequency bands for downlink data transmission. The transmitter 213 transmits downlink control signaling to user equipment on a first frequency band, and transmits downlink user data to the user equipment by using a beamforming technology on a second frequency band. The first frequency band and the second frequency band belong to a same cell and are synchronous, a frequency of the first frequency band is lower than a frequency of the second frequency band, and a bandwidth of the first frequency band is less than a bandwidth of the second frequency band. Being synchronous means that both frame numbers and frame boundaries of data frames or control frames that are transmitted on the first frequency band and the second frequency band are consistent. The second frequency band uses an extremely high frequency or super high frequency spectrum resource, and a bandwidth is very wide, for example, a bandwidth of tens of GHz. The second frequency band is used to provide high-speed user data transmission, and the beamforming technology is used to increase a transmit radius of the frequency band. The first frequency band uses a lower spectrum resource compared with that used by the second frequency band, and it is quite possible that a spectrum of the first frequency band is much lower than that of the second frequency band, such as a spectrum within 3 GHz; or a spectrum resource of a lower-frequency part of a super high frequency is used, such as a spectrum resource of 10 GHz. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system. The memory 214 is configured to store downlink control signaling and downlink user data that need to be transmitted. The downlink control signaling transmitted by the transmitter 213 to the user equipment on the first frequency band includes at least one of the following: system information, paging signaling, random access signaling, RRC signaling, layer 2 signaling, physical layer signaling, a sounding reference signal, or a synchronization signal. In this embodiment of the present invention, it may be also that the first frequency band is used to transmit only control signaling, and the second frequency band is used to transmit only user data.

In this embodiment of the present invention, uplink control signaling may be transmitted using two methods. Method 1: The receiver 211 receives, on the first frequency band, at least one of uplink control signaling, initial access signaling, or random access signaling, where the at least one of the uplink control signaling, the initial access signaling, or the random access signaling is sent by the user equipment. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Method 2: The receiver 211 receives, on a third frequency band, at least one of uplink control signaling, initial access signaling, or random access signaling, where the at least one of the uplink control signaling, the initial access signaling, or the random access signaling is sent by the user equipment. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Being synchronous means that, from a perspective of the base station 21, both frame numbers and frame boundaries of data frames or control frames that are transmitted on the first frequency band and the second frequency band are consistent. Frequencies of the third frequency band and the first frequency band are close, and bandwidths of the third frequency band and the first frequency band are close or equal, so as to ensure a proper coverage radius for uplink data transmission.

In this embodiment of the present invention, to ensure that the user equipment enters the coverage area or the service range of the cell, that is, the user equipment can transmit data, whether the user equipment has entered the coverage area of the cell needs to be determined. A determining method is that the transmitter 213 broadcasts a signal strength threshold on the first frequency band, and the processor 212 determines, according to the signal strength threshold and actual signal strength that is of the first frequency band and that is reported by the user equipment, whether the user equipment has entered the coverage area of the cell. The signal strength threshold is equal to or close to signal strength of the first frequency band at a coverage edge of the cell or the second frequency band. If the actual signal strength that is of the first frequency band and that is measured by the user equipment is greater than the signal strength threshold, it indicates that the user equipment has entered the coverage area of the cell, and the cell is used as the target cell for handover. In this embodiment of the present invention, the processor 212 further estimates a channel state of the second frequency band according to the signal strength threshold and the actual signal strength that is of the first frequency band and that is measured by the user equipment. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment is at a coverage edge of the second frequency band, and a signal on the second frequency band is relatively weak. The base station 21 may determine, according to the obtained channel state of the second frequency band, resource scheduling for the user equipment or a modulation and coding scheme used for transmission.

By using the beamforming technology, a signal on the second frequency band is transmitted to only one very narrow direction. Therefore, before sending downlink user data, the base station 21 needs to learn of a direction of the user equipment, that is, a beamforming transmission direction needs to be determined, so that the user equipment can receive the downlink user data. In this embodiment of the present invention, according to different methods for transmitting the uplink control signaling, the receiver 211 may receive the initial access signaling or the random access signaling that is sent by the user equipment on the first frequency band, and obtain a signal transmission direction of the user equipment; or the receiver 211 receives the initial access signaling or the random access signaling that is sent by the user equipment on the third frequency band, and obtains a signal transmission direction of the user equipment; and the transmitter 213 transmits, on the second frequency band, the downlink user data to the user equipment according to the signal transmission direction by using the beamforming technology. The base station 21 may also notify the user equipment of the signal transmission direction, so as to send uplink user data to the base station 21.

Figure 7:
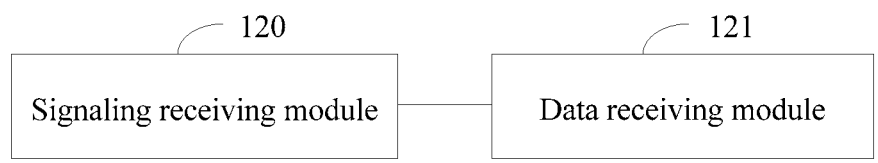
FIG. 7 is a schematic structural diagram of user equipment according to a first embodiment of the present invention.

FIG. 7 is a schematic structural diagram of user equipment according to a first embodiment of the present invention. As shown in FIG. 7, the user equipment 12 includes: a signaling receiving module 120 and a data receiving module 121. The signaling receiving module 120 is configured to receive downlink control signaling that is transmitted by a base station on a first frequency band. The data receiving module 121 is connected to the signaling receiving module 120, and is configured to receive downlink user data transmitted by the base station on a second frequency band. The first frequency band and the second frequency band belong to a same cell and are synchronous, a frequency of the first frequency band is lower than a frequency of the second frequency band, and a bandwidth of the first frequency band is less than a bandwidth of the second frequency band. Being synchronous means that, from a perspective of a base station, both frame numbers and frame boundaries of data frames or control frames that are transmitted on the first frequency band and the second frequency band are consistent.

In this embodiment of the present invention, one cell uses two frequency bands for downlink data transmission, where the first frequency band is used to transmit downlink control signaling, and the second frequency band is used to transmit downlink user data. The second frequency band uses an extremely high frequency or super high frequency spectrum resource, and a bandwidth is very wide, for example, a bandwidth of tens of GHz. The second frequency band is used to provide high-speed user data transmission, and a beamforming technology is used to increase a transmit radius of the frequency band. The first frequency band uses a lower spectrum resource compared with that used by the second frequency band, and it is quite possible that a spectrum of the first frequency band is much lower than that of the second frequency band, such as a spectrum within 3 GHz; or a spectrum resource of a lower-frequency part of a super high frequency is used, such as a spectrum resource of 10 GHz. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system.

In a more specific embodiment, the downlink control signaling received by the signaling receiving module 120 includes at least one of the following: system information, paging signaling, random access signaling, RRC signaling, layer 2 signaling, physical layer signaling, a sounding reference signal, or a synchronization signal. In another embodiment of the present invention, it may be also that the first frequency band is used to transmit only control signaling, and the second frequency band is used to transmit only user data.

Figure 8:
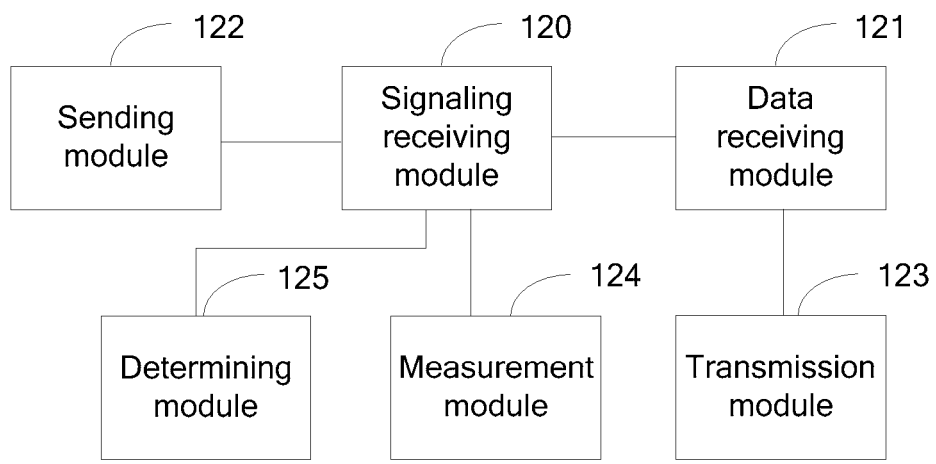
FIG. 8 is a schematic structural diagram of user equipment according to a second embodiment of the present invention.

As shown in FIG. 8, the user equipment 12 further includes a sending module 122, a transmission module 123, a measurement module 124, and a determining module 125. The transmission module 123 is connected to the data receiving module 121. The measurement module 124 is connected to the signaling receiving module 120. The determining module 125 is connected to the signaling receiving module 120.

For uplink control signaling transmission, the sending module 122 may send, on the first frequency band, to the base station at least one of uplink control signaling, initial access signaling, or random access signaling. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Alternatively, the sending module 122 sends, on a third frequency band, to the base station at least one of uplink control signaling, initial access signaling, or random access signaling. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Frequencies of the third frequency band and the first frequency band are close, and bandwidths of the third frequency band and the first frequency band are close or equal, so as to ensure a proper coverage radius for uplink data transmission.

In this embodiment of the present invention, if the user equipment 12 is in an idle state, the measurement module 124 measures signal strength of the first frequency band on the first frequency band or the third frequency band, and cell selection is determined according to the signal strength of the first frequency band. When needing to establish a connection so as to initiate a service, the user equipment 12 initiates the initial access on the first frequency band or the third frequency band. The signaling receiving module 120 further receives a signal strength threshold that is broadcast by the base station on the first frequency band, and the determining module 125 determines, according to the signal strength threshold and the measured actual signal strength of the first frequency band, whether the user equipment has entered the coverage area of the cell. The signal strength threshold is equal to or close to signal strength of the first frequency band at a coverage edge of the cell or the second frequency band. If the actual signal strength that is of the first frequency band and that is measured by the measurement module 124 is greater than the signal strength threshold, it indicates that the user equipment 12 has entered the coverage area of the cell, and the cell is used as the target cell for handover. In this embodiment of the present invention, the determining module 125 further estimates a channel state of the second frequency band according to the signal strength threshold and the actual signal strength that is of the first frequency band and that is measured by the measurement module 124. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment 12 is at a coverage edge of the second frequency band, and a signal on the second frequency band is relatively weak. The user equipment 12 may determine, according to the obtained channel state of the second frequency band, resource scheduling or a modulation and coding scheme used for transmission.

In this embodiment of the present invention, according to different methods for transmitting uplink control signaling, a sending module 122 may initiate initial access or random access on a first frequency band to a base station, so that the base station obtains a signal transmission direction of user equipment 12, and transmits downlink user data to the user equipment 12 according to the signal transmission direction by using the beamforming technology on a second frequency band. Alternatively, a sending module 122 may initiate, on a third frequency band, initial access or random access to a base station, so that the base station obtains a signal transmission direction of user equipment 12, and transmits downlink user data to the user equipment 12 according to the signal transmission direction by using the beamforming technology on a second frequency band. The signaling receiving module 120 may receive the signal transmission direction sent by the base station, and the transmission module 123 transmits uplink user data to the base station according to the signal transmission direction.

Figure 9:
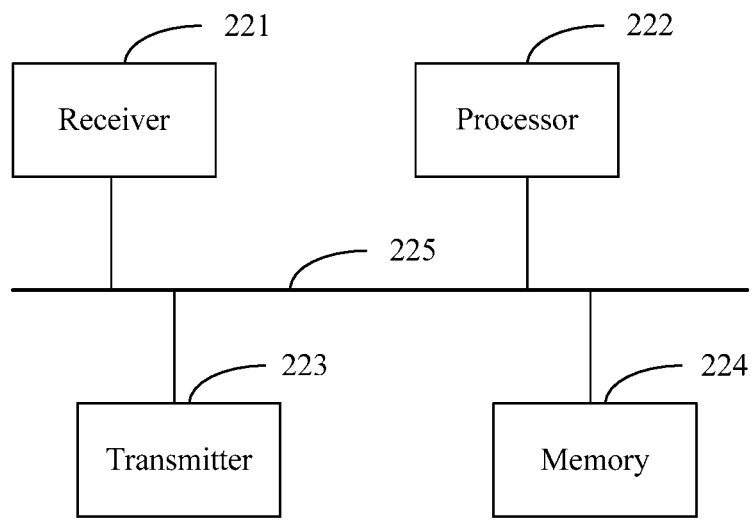
FIG. 9 is a schematic structural diagram of user equipment according to a third embodiment of the present invention.

FIG. 9 is a schematic structural diagram of user equipment according to a third embodiment of the present invention. As shown in FIG. 9, the user equipment 22 includes: a receiver 221, a processor 222, a transmitter 223, a memory 224, and a data bus 225. The receiver 221, the processor 222, the transmitter 223, and the memory 224 are connected by using the data bus 225 for mutual communication.

In this embodiment of the present invention, one cell uses two frequency bands for downlink data transmission. The receiver 221 is configured to: receive downlink control signaling that is transmitted by a base station on a first frequency band, and receive downlink user data transmitted by the base station on a second frequency band. The first frequency band and the second frequency band belong to a same cell and are synchronous, a frequency of the first frequency band is lower than a frequency of the second frequency band, and a bandwidth of the first frequency band is less than a bandwidth of the second frequency band. Being synchronous means that, from a perspective of a base station, both frame numbers and frame boundaries of data frames or control frames that are transmitted on the first frequency band and the second frequency band are consistent. The second frequency band uses an extremely high frequency or super high frequency spectrum resource, and a bandwidth is very wide, for example, a bandwidth of tens of GHz. The second frequency band is used to provide high-speed user data transmission, and a beamforming technology is used to increase a transmit radius of the frequency band. The first frequency band uses a lower spectrum resource compared with that used by the second frequency band, and it is quite possible that a spectrum of the first frequency band is much lower than that of the second frequency band, such as a spectrum within 3 GHz; or a spectrum resource of a lower-frequency part of a super high frequency is used, such as a spectrum resource of 10 GHz. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system. The downlink control signaling received by the receiver 221 includes at least one of the following: system information, paging signaling, random access signaling, RRC signaling, layer 2 signaling, physical layer signaling, a sounding reference signal, or a synchronization signal. In another embodiment of the present invention, it may be also that the first frequency band is used to transmit only control signaling, and the second frequency band is used to transmit only user data.

In this embodiment of the present invention, for uplink control signaling transmission, the transmitter 223 may send, on the first frequency band, to the base station at least one of uplink control signaling, initial access signaling, or random access signaling. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Alternatively, the transmitter 223 sends, on a third frequency band, to the base station at least one of uplink control signaling, initial access signaling, or random access signaling. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Frequencies of the third frequency band and the first frequency band are close, and bandwidths of the third frequency band and the first frequency band are close or equal, so as to ensure a proper coverage radius for uplink data transmission.

In this embodiment of the present invention, if the user equipment 22 is in an idle state, the processor 222 measures signal strength of the first frequency band on the first frequency band or the third frequency band, and cell selection is determined according to the signal strength of the first frequency band. When needing to establish a connection so as to initiate a service, the user equipment 22 initiates the initial access on the first frequency band or the third frequency band. The receiver 221 further receives a signal strength threshold that is broadcast by the base station on the first frequency band, and the processor 222 determines, according to the signal strength threshold and the measured actual signal strength of the first frequency band, whether the user equipment has entered the coverage area of the cell. The signal strength threshold is equal to or close to signal strength of the first frequency band at a coverage edge of the cell or the second frequency band. If the actual signal strength that is of the first frequency band and that is measured by the processor 222 is greater than the signal strength threshold, it indicates that the user equipment 22 has entered the coverage area of the cell, and the cell is used as the target cell for handover. In this embodiment of the present invention, the processor 222 further estimates a channel state of the second frequency band according to the signal strength threshold and the measure actual signal strength of the first frequency band. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment 22 is at a coverage edge of the second frequency band, and a signal on the second frequency band is relatively weak. The user equipment 22 may determine, according to the obtained channel state of the second frequency band, resource scheduling or a modulation and coding scheme used for transmission.

In this embodiment of the present invention, according to different methods for transmitting uplink control signaling, a transmitter 223 may initiate initial access or random access on a first frequency band to a base station, so that the base station obtains a signal transmission direction of user equipment 22, and transmits downlink user data to the user equipment 22 according to the signal transmission direction by using the beamforming technology on a second frequency band. Alternatively, a transmitter 223 may initiate, on a third frequency band, initial access or random access to a base station, so that the base station obtains a signal transmission direction of user equipment 22, and transmits downlink user data to the user equipment 22 according to the signal transmission direction by using the beamforming technology on a second frequency band. A receiver 221 may receive the signal transmission direction sent by the base station, and the transmitter 223 transmits uplink user data to the base station according to the signal transmission direction.

Figure 10:
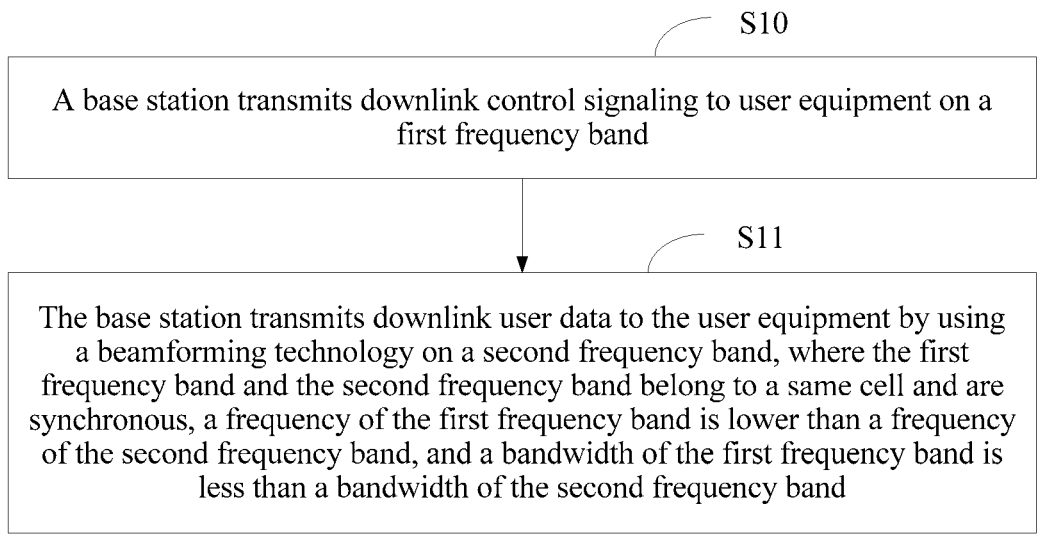
FIG. 10 is a schematic flowchart of a wireless communications method according to a first embodiment of the present invention.

FIG. 10 is a schematic flowchart of a wireless communications method according to a first embodiment of the present invention. As shown in FIG. 10, the wireless communications method includes the following steps.

S10. A base station transmits downlink control signaling to user equipment on a first frequency band.

Being synchronous means that both frame numbers and frame boundaries of data frames or control frames that are transmitted on the first frequency band and a second frequency band are consistent. The downlink control signaling includes at least one of the following: system information, paging signaling, random access signaling, RRC signaling, layer 2 signaling, physical layer signaling, a sounding reference signal, or a synchronization signal.

In this embodiment of the present invention, for uplink control signaling transmission, the base station may receive, on the first frequency band, at least one of an uplink control signaling, initial access signaling, or random access signaling that is sent by the user equipment. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Alternatively, the base station receives, on a third frequency band, at least one of uplink control signaling, initial access signaling, or random access signaling, where the at least one of the uplink control signaling, the initial access signaling, or the random access signaling is sent by the user equipment. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Frequencies of the third frequency band and the first frequency band are close, and bandwidths of the third frequency band and the first frequency band are close or equal, so as to ensure a proper coverage radius for uplink data transmission.

In S10, the base station further broadcasts a signal strength threshold on the first frequency band, and determines, according to the signal strength threshold and actual signal strength that is of the first frequency band and that is reported by the user equipment, whether the user equipment has entered a coverage area of the cell. The signal strength threshold is equal to or close to signal strength of the first frequency band at a coverage edge of the cell or the second frequency band. If the actual signal strength that is of the first frequency band and that is measured by the user equipment is greater than the signal strength threshold, it indicates that the user equipment has entered the coverage area of the cell, and the cell is used as the target cell for handover. The base station further estimates a channel state of the second frequency band according to the signal strength threshold and the actual signal strength that is of the first frequency band and that is measured by the user equipment. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment is at a coverage edge of the second frequency band, and a signal on the second frequency band is relatively weak. The base station may determine, according to the obtained channel state of the second frequency band, resource scheduling for the user equipment or a modulation and coding scheme used for transmission.

S11. The base station transmits downlink user data to the user equipment by using a beamforming technology on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band.

Before S11, a direction of the user equipment needs to be learned of, to determine a transmission direction of the beamforming, so that the user equipment can receive downlink user data. Specifically, according to different methods for transmitting uplink control signaling, the base station may receive the initial access signaling or the random access signaling that is sent by the user equipment on the first frequency band, and may obtain a signal transmission direction of the user equipment; or the base station receives the initial access signaling or the random access signaling that is sent by the user equipment on the third frequency band, and obtains a signal transmission direction of the user equipment. The base station may notify the user equipment of the obtained signal transmission direction, so that the user equipment sends uplink user data to the base station according to the signal transmission direction. In S11, the base station transmits, on the second frequency band, the downlink user data to the user equipment according to the signal transmission direction by using the beamforming technology.

In this embodiment of the present invention, one cell uses two frequency bands for downlink data transmission, where the first frequency band is used to transmit downlink control signaling, and the second frequency band is used to transmit downlink user data. The second frequency band uses an extremely high frequency or super high frequency spectrum resource, and a bandwidth is very wide, for example, a bandwidth of tens of GHz. The second frequency band is used to provide high-speed user data transmission, and the beamforming technology is used to increase a transmit radius of the frequency band. The first frequency band uses a lower spectrum resource compared with that used by the second frequency band, and it is quite possible that a spectrum of the first frequency band is much lower than that of the second frequency band, such as a spectrum within 3 GHz; or a spectrum resource of a lower-frequency part of a super high frequency is used, such as a spectrum resource of 10 GHz. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system.

Figure 11:
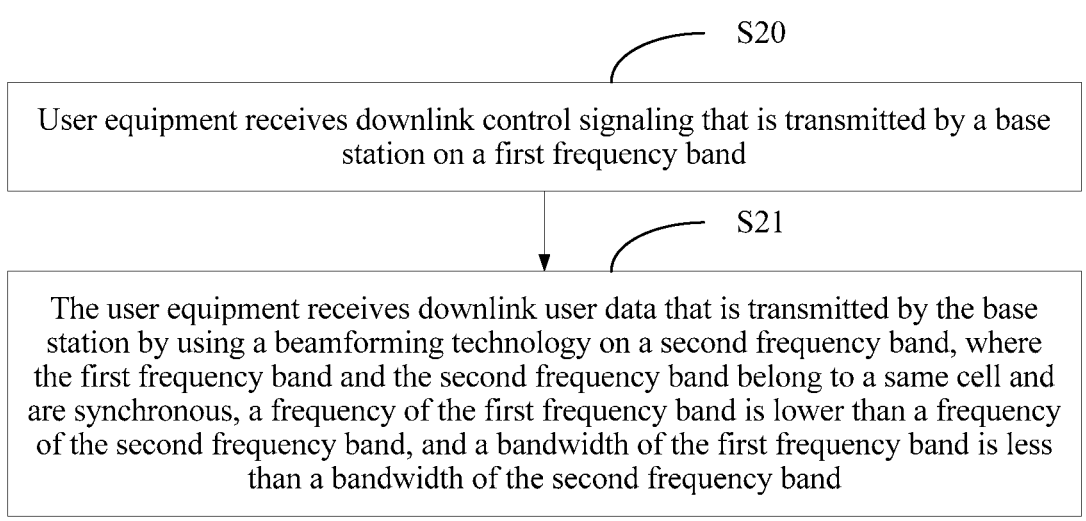
FIG. 11 is a schematic flowchart of a wireless communications method according to a second embodiment of the present invention.

FIG. 11 is a schematic flowchart of a wireless communications method according to a second embodiment of the present invention. As shown in FIG. 11, the wireless communications method includes the following steps.

S20. User equipment receives downlink control signaling that is transmitted by a base station on a first frequency band.

Being synchronous means that, from a perspective of the base station, both frame numbers and frame boundaries of data frames or control frames that are transmitted on the first frequency band and the second frequency band are consistent. The downlink control signaling includes at least one of the following: system information, paging signaling, random access signaling, RRC signaling, layer 2 signaling, physical layer signaling, a sounding reference signal, or a synchronization signal.

In this embodiment of the present invention, for uplink control signaling transmission, the user equipment may send, on the first frequency band, to the base station at least one of uplink control signaling, initial access signaling, or random access signaling. That is, a TDD mode is used for transmitting the uplink control signaling and the downlink control signaling. Some subframes are used for downlink control signaling transmission, and some subframes are used for the uplink control signaling transmission. In this case, only one frequency band is required for control signaling transmission, thereby improving the spectral efficiency. Alternatively, the user equipment sends, on a third frequency band, to the base station at least one of uplink control signaling, initial access signaling, or random access signaling. That is, an FDD mode is used for transmitting the uplink control signaling and the downlink control signaling, so that a mechanism such as a data scheduling mechanism is simple. The third frequency band and the first frequency band belong to the same cell and are synchronous, the frequency of the third frequency band is lower than the frequency of the second frequency band, and the bandwidth of the third frequency band is less than the bandwidth of the second frequency band. Frequencies of the third frequency band and the first frequency band are close, and bandwidths of the third frequency band and the first frequency band are close or equal, so as to ensure a proper coverage radius for uplink data transmission.

In this embodiment of the present invention, if the user equipment is in an idle state, signal strength of the first frequency band is measured on the first frequency band or the third frequency band, and cell selection is determined according to the signal strength of the first frequency band. When needing to establish a connection so as to initiate a service, the user equipment initiates the initial access on the first frequency band or the third frequency band. In S20, the user equipment further receives a signal strength threshold that is broadcast by the base station on the first frequency band, and the user equipment determines, according to the signal strength threshold and the measured actual signal strength of the first frequency band, whether the user equipment has entered the coverage area of the cell. The signal strength threshold is equal to or close to signal strength of the first frequency band at a coverage edge of the cell or the second frequency band. If the actual signal strength that is of the first frequency band and that is measured by the user equipment is greater than the signal strength threshold, it indicates that the user equipment has entered the coverage area of the cell, and the cell is used as the target cell for handover. In this embodiment of the present invention, the user equipment further estimates a channel state of the second frequency band according to the signal strength threshold and the actual signal strength that is of the first frequency band and that is measured by a measurement module. When the actual signal strength of the first frequency band is much greater than the signal strength threshold, it indicates that a signal on the second frequency band is very strong. If the actual signal strength of the first frequency band is almost equal to the signal strength threshold, it indicates that the user equipment is at a coverage edge of the second frequency band, and a signal on the second frequency band is relatively weak. The user equipment may determine, according to the obtained channel state of the second frequency band, resource scheduling or a modulation and coding scheme used for transmission.

S21. The user equipment receives downlink user data that is transmitted by the base station by using a beamforming technology on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band.

Before S21, a direction of the user equipment needs to be learned of, to determine a transmission direction of the beamforming, so that the user equipment can receive downlink user data. Specifically, according to different methods for transmitting uplink control signaling, the user equipment sends, on the first frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology; or the user equipment sends, on the third frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology. The user equipment further receives the signal transmission direction sent by the base station, and transmits uplink user data to the base station according to the signal transmission direction.

In this embodiment of the present invention, one cell uses two frequency bands for downlink data transmission, where the first frequency band is used to transmit downlink control signaling, and the second frequency band is used to transmit downlink user data. The second frequency band uses an extremely high frequency or super high frequency spectrum resource, and a bandwidth is very wide. The second frequency band is used to provide high-speed user data transmission, and a beamforming technology is used to increase a transmit radius of the frequency band. The first frequency band uses a lower spectrum resource compared with that used by the second frequency band, and it is quite possible that a spectrum of the first frequency band is much lower than that of the second frequency band; or a spectrum resource of a lower-frequency part of a super high frequency is used. A common transmission technology may be used on the first frequency band, so that a signal may cover the entire cell, thereby effectively enlarging a coverage area of the cell and improving signaling reliability. Certainly, in another embodiment of the present invention, the beamforming technology may also be used on the first frequency band to transmit the downlink control signaling. The first frequency band is used to transmit only the downlink control signaling, and the bandwidth may be very narrow, such as several MHz, or even less than 1 MHz. Therefore, the valuable spectrum resource may be saved, and spectral efficiency is improved, thereby improving performance of the entire system.

In conclusion, in the present invention, two frequency bands are used for downlink data transmission. A base station transmits downlink control signaling to user equipment on a first frequency band, and transmits downlink user data to the user equipment on a second frequency band, where the first frequency band and the second frequency band belong to a same cell and are synchronous, a frequency of the first frequency band is lower than a frequency of the second frequency band, and a bandwidth of the first frequency band is less than a bandwidth of the second frequency band. This can effectively enlarge a coverage area of the cell, and improve signaling reliability and spectral efficiency, thereby improving system performance.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A base station, comprising:
    a signaling transmitter, configured to:
        transmit, using a first transmit power and only on a first frequency band, downlink control signaling to user equipment; and
        broadcast a signal strength threshold on the first frequency band;
    a processor, connected to the signal transmitter and configured to determine, according to the signal strength threshold and an actual signal strength associated with the first frequency band and from the user equipment, whether the user equipment has entered a coverage area of a same cell using both the first frequency band and a second frequency band; and
    a data transmitter, connected to the signaling transmitter and configured to transmit only on the second frequency band, using a beamforming technology, and using a second transmit power, downlink user data to the user equipment, wherein the second transmit power is a transmit power that is greater in value than the first transmit power and causes the first frequency band and the second frequency band to have a similar coverage radius,
    wherein the first frequency band and the second frequency band are synchronous, a frequency of the first frequency band is lower than a frequency of the second frequency band, and a bandwidth of the first frequency band is less than a bandwidth of the second frequency band, and
    wherein synchronous means that both frame numbers and frame boundaries of data frames or control frames transmitted on the first frequency band and the second frequency band are consistent.

2. The base station according to claim 1, wherein the downlink control signaling comprises at least one of the following: system information, paging signaling, random access signaling, RRC signaling, layer 2 signaling, physical layer signaling, a sounding reference signal, or a synchronization signal.

3. The base station according to claim 1, wherein the base station further comprises a receiver, connected to the data transmitter and configured to receive, on the first frequency band, at least one of uplink control signaling, initial access signaling, or random access signaling, wherein the at least one of the uplink control signaling, the initial access signaling, or the random access signaling is sent by the user equipment.

4. The base station according to claim 3, wherein:
    the receiver receives the initial access signaling or the random access signaling that is sent by the user equipment on the first frequency band, and obtains a signal transmission direction of the user equipment; and
    the data transmitter transmits, on the second frequency band, the downlink user data to the user equipment according to the signal transmission direction by using the beamforming technology.

5. The base station according to claim 1, wherein the receiver receives, on a third frequency band, at least one of uplink control signaling, initial access signaling, or random access signaling, wherein the at least one of the uplink control signaling, the initial access signaling, or the random access signaling is sent by the user equipment, the third frequency band and the first frequency band belong to the same cell and are synchronous, a frequency of the third frequency band is lower than the frequency of the second frequency band, and a bandwidth of the third frequency band is less than the bandwidth of the second frequency band.

6. The base station according to claim 5, wherein:
    the receiver receives the initial access signaling or the random access signaling that is sent by the user equipment on the third frequency band, and obtains a signal transmission direction of the user equipment; and
    the data transmitter transmits, on the second frequency band, the downlink user data to the user equipment according to the signal transmission direction by using the beamforming technology.

7. A wireless communications method, comprising:
    transmitting, by a base station and using a first transmit power, downlink control signaling to user equipment only on a first frequency band;
    broadcast, by the base station, a signal threshold on the first frequency band;
    receive, by the base station and from the user equipment, an actual signal strength associated with the first frequency band;
    determine, by the base station and according to the signal strength threshold and the actual signal strength, whether the user equipment has entered a coverage area of a same cell using both the first frequency band and a second frequency band; and
    transmitting, by the base station, only on the second frequency band, and using beamforming technology and a second transmit power, downlink user data to the user equipment, wherein the second transmit power is a transmit power that is greater in value than the first transmit power and causes the first frequency band and the second frequency band to have a similar coverage radius,
    wherein the first frequency band and the second frequency band are synchronous, a frequency of the first frequency band is lower than a frequency of the second frequency band, and a bandwidth of the first frequency band is less than a bandwidth of the second frequency band, and
    wherein synchronous means that both frame numbers and frame boundaries of data frames or control frames transmitted on the first frequency band and the second frequency band are consistent.

8. The method according to claim 7, wherein the downlink control signaling comprises at least one of the following: system information, paging signaling, random access signaling, RRC signaling, layer 2 signaling, physical layer signaling, a sounding reference signal, or a synchronization signal.

9. The method according to claim 7, wherein the method further comprises: receiving, by the base station and on the first frequency band, at least one of uplink control signaling, initial access signaling, or random access signaling, wherein the at least one of the uplink control signaling, the initial access signaling, or the random access signaling is sent by the user equipment.

10. A user equipment, comprising:
a signaling receiver, configured to:
receive, from a base station, downlink control signaling, wherein the base station transmits the downlink control signaling using a first transmit power and only on a first frequency band; and
receive a signal strength threshold from the base station on the first frequency band;
a processor, connected to the signaling receiver and configured to determine, according to the signal strength threshold and a measured actual signal strength of the first frequency band, whether the user equipment has entered a coverage area of a same cell using both the first frequency band and a second frequency band; and
a data receiver, connected to the signaling receiver and configured to receive, from the base station, downlink user data, wherein the base station transmits the downlink user data using a second transmit power and only on the second frequency band, wherein the second transmit power is a transmit power that is greater in value than the first transmit power and causes the first frequency band and the second frequency band to have a similar coverage radius,
wherein the first frequency band and the second frequency band are synchronous, a frequency of the first frequency band is lower than a frequency of the second frequency band, and a bandwidth of the first frequency band is less than a bandwidth of the second frequency band, and
wherein synchronous means that both frame numbers and frame boundaries of data frames or control frames transmitted on the first frequency band and the second frequency band are consistent.

11. The user equipment according to claim 10, wherein the downlink control signaling comprises at least one of the following: system information, paging signaling, random access signaling, RRC signaling, layer 2 signaling, physical layer signaling, a sounding reference signal, or a synchronization signal.

12. The user equipment according to claim 10, wherein the user equipment further comprises a transmitter, configured to send, on the first frequency band, at least one of uplink control signaling, initial access signaling, or random access signaling to the base station.

13. The user equipment according to claim 12, wherein the transmitter initiates, on the first frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology.

14. The user equipment according to claim 10, wherein the transmitter is configured to send, on the third frequency band, at least one of uplink control signaling, initial access signaling, or random access signaling to the base station, wherein the third frequency band and the first frequency band belong to the same cell and are synchronous, a frequency of the third frequency band is lower than the frequency of the second frequency band, and a bandwidth of the third frequency band is less than the bandwidth of the second frequency band.

15. The user equipment according to claim 14, wherein the transmitter sends, on the third frequency band, the initial access signaling or the random access signaling to the base station, so that the base station obtains a signal transmission direction of the user equipment, and transmits, on the second frequency band, the downlink user data to the user equipment according to the signal transmission direction by using the beamforming technology.

16. The user equipment according to claim 13, wherein the user equipment further comprises a data transmitter, connected to the data receiver;
wherein the data receiver receives the signal transmission direction sent by the base station; and
wherein the data transmitter transmits uplink user data to the base station according to the signal transmission direction.

17. The user equipment according to claim 12, wherein if the user equipment is in an idle state, the processor measures the signal strength of the first frequency band on the first frequency band or the third frequency band.

18. The user equipment according to claim 10, wherein the signal strength threshold is equal to or close to signal strength of the first frequency band at a coverage edge of the same cell or the second frequency band.

* * * * *